United States Patent
Jiang et al.

(10) Patent No.: US 11,308,289 B2
(45) Date of Patent: Apr. 19, 2022

(54) NORMALIZATION OF MEDICAL TERMS WITH MULTI-LINGUAL RESOURCES

(71) Applicant: International Business Machines Corporation, Armonk, NY (US)

(72) Inventors: Jian Min Jiang, Beijing (CN); Jian Wang, Beijing (CN); Songfang Huang, Beijing (CN); Jing Li, Beijing (CN); Ke Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 16/569,874

(22) Filed: Sep. 13, 2019

(65) Prior Publication Data
US 2021/0081502 A1    Mar. 18, 2021

(51) Int. Cl.
| G06F 40/58 | (2020.01) |
| G06F 40/44 | (2020.01) |
| G06F 40/197 | (2020.01) |
| G06F 40/237 | (2020.01) |

(52) U.S. Cl.
CPC ........... *G06F 40/58* (2020.01); *G06F 40/197* (2020.01); *G06F 40/237* (2020.01); *G06F 40/44* (2020.01)

(58) Field of Classification Search
CPC ...... G06F 40/30; G06F 40/58; G06F 16/3337; G06F 16/3344; G06F 40/20; G06F 40/242; G06F 40/40; G06F 40/42; G06F 40/44; G06F 40/197; G06F 40/237
See application file for complete search history.

(56) References Cited

U.S. PATENT DOCUMENTS

| 7,225,199 B1* | 5/2007 | Green ................... G06F 40/30 |
| 9,390,160 B2 | 7/2016 | Alecu et al. |
| 10,490,306 B2* | 11/2019 | Haley .................. G06F 16/951 |
| 10,679,014 B2* | 6/2020 | Yamauchi ............. G06F 40/47 |
| 10,984,784 B2* | 4/2021 | Kuczmarski ........... G10L 15/22 |
| 2007/0143273 A1* | 6/2007 | Knaus .................. G06F 16/951 |
| 2010/0274552 A1* | 10/2010 | Gao ....................... G06F 40/51 |
| | | 704/2 |
| 2013/0246067 A1* | 9/2013 | Mailhot ................ G16H 15/00 |
| | | 704/260 |

(Continued)

OTHER PUBLICATIONS

Yunqing Xia et al. "Normalization of Chinese Informal Medical Terms Based on Multi-field Indexing,"NLPCC 2014, CCIS 496, pp. 311-320, 2014.

(Continued)

*Primary Examiner* — Wilson W Tsui
(74) *Attorney, Agent, or Firm* — Patterson + Sheridan, LLP (57) ABSTRACT

Method and apparatus are presented for receiving a medical or medical condition related input term or phrase in a source language, and translating the term or phrase from the source language into at least one target language to obtain a set of translated terms of the input term. For each translated term in the set of translations, the method and apparatus further translate the set of translations back into the source language to obtain an output list of standard versions of the input term, scoring each entry of the output list as to probability of being the most standard version of the input term, and providing the entry of the output list that has the highest score to a user.

20 Claims, 4 Drawing Sheets

(56) References Cited

U.S. PATENT DOCUMENTS

| | | | | |
|---|---|---|---|---|
| 2014/0172407 A1* | 6/2014 | Eden | .................. | G06F 40/42 |
| | | | | 704/2 |
| 2015/0356270 A1* | 12/2015 | Devarakonda | ......... | G16H 15/00 |
| | | | | 705/3 |
| 2017/0032087 A1* | 2/2017 | Tanase | .................. | G16H 40/20 |
| 2017/0032273 A1* | 2/2017 | Ho | .................. | G06N 7/005 |
| 2018/0090128 A1* | 3/2018 | Kurata | .................. | G06F 40/20 |
| 2019/0103193 A1 | 4/2019 | Padgett et al. | | |
| 2019/0171719 A1* | 6/2019 | Vasiltschenko | ..... | G06F 16/3337 |
| 2020/0097554 A1* | 3/2020 | Rezagholizadeh | .. | G06N 3/0454 |

OTHER PUBLICATIONS

Mi-Young Kim and Randy Goebel, "Detection and Normalization of Medical Terms Using Domain-specific Term Frequency and Adaptive Ranking," 978-1-4244-6561-3/101$26.00 © 2010 IEEE.
Naiara Perez-Miguel, Montse Cuadros, German Rigau,"Biomedical term normalization of EHRs with UMLS," arXiv:1802.02870v2 [cs.CL] May 24, 2018.

\* cited by examiner

NORMALIZATION OF MEDICAL TERMS WITH MULTI-LINGUAL RESOURCES

BACKGROUND

The present invention relates to natural language processing, and more specifically, to normalization of medical terms using multi-lingual resources.

Natural language processing involves receiving spoken or written input from users. Some languages use a significant amount of colloquialisms. Or, for example, there may be several terms that mean the same thing, and it is useful to use only one, the most standard one, for computing purposes. When receiving input from users or clients via a natural language processing interface, it may be difficult to map the multiple words or phrases such users provide to describe an idea or condition to a more technical, official or standard term that is understood and used by the processing system. Moreover, even if a natural language processing system understands colloquial terminology, it needs to use a normalized term, and use that normalized term consistently, so that, for example, medical records describing identical or similar symptoms are understood to be referring to the same thing. This allows for statistical analysis, semantic vector creation, medical record generation or comparison, billing, and other types of processing that require the use of a standard, or uniform, terminology and nomenclature so that multiple medical records may be processed and analyzed together.

The problem of a colloquial vocabulary or terminology is especially egregious in the medical domain. Patients reporting symptoms via a natural language processing interface of a medical processing system, whether in spoken or in written form, may use a variety of terms to describe a particular symptom, condition or history that do not correspond to the standard technical, academic, or scientific terminology for that condition, syndrome, or symptomology. However, it may be precisely the technical, academic, or scientific term that the natural language processing interface understands and routinely uses, or wants to use for consistency and accuracy. For example, in Chinese, the term for "nausea" is 恶心 (pronounced "Ěxīr"). However, an alternate term for this condition is 反胃 (pronounced "Fǎnwèi"), and a still alternate term 晕船 (pronounced "Yùnchuán") may be used, which more precisely means "seasickness." Various users may use each of these terms in various symptom reporting contexts. If different terms for the same concept are used, a processing system may not recognize that these terms all refer to the same condition, and thus that the cases are similar or even identical.

It is desirable to provide solutions to these issues.

SUMMARY

According to one embodiment of the present disclosure, a method is provided. The method includes receiving a medical or medical condition related input term or descriptor in a source language, and translating the term or descriptor from the source language into at least one target language to obtain a set of translated terms of the input term. The method further includes, for each translated term in the set of translations, translating the set of translations back into the source language to obtain an output list of standard versions of the input term or descriptor. The method still further includes scoring each entry of the output list as to probability of being the most standard version of the input term or descriptor, and providing the entry of the output list having the highest score to a user.

According to a second embodiment of the present disclosure, a computer-readable storage medium is provided. The computer-readable storage medium has computer-readable program code embodied therewith, the computer-readable program code executable by one or more computer processors to perform an operation. The operation includes receiving an input term or descriptor from a user in a source language, and translating the term or descriptor from the source language into at least one target language to obtain a set of translations. The operation further includes, for each target language, translating the set of translations back into the source language to obtain an output list, scoring the output list, and providing the scored output list to the user.

According to a third embodiment of the present disclosure, a system is provided. The system includes an input interface configured to receive an input medical term or descriptor, an output interface, and a medical term normalization engine coupled to the input interface and to the output interface. The medical term normalization engine is configured to convert the input medical term or descriptor into a standard or normalized equivalent via translation of the input term from its source language into a target language, followed by re-translating a set of translations from the target language back into the source language, and output, via the output interface, one or more normalized terms corresponding to the medical term or descriptor.

DETAILED DESCRIPTION

In embodiments, an input term or phrase that is descriptive of a medical condition or problem may be received from a user in a source language. The term or phrase is the common usage in the spoken version of the source language, and is not necessarily the official, standard, or scientific term used by medical care personnel. The user, for example, may be an actual patient of a medical provider who uses the term to describe a problem they are experiencing, or who used the term in a question that they may have articulated about their health. Or, for example, the user may be a health care provider, or an automated health care system, for example, to whom the actual patient may have spoken or written to. In this latter case, there is a recording of a voice, or, for example, a written record of what the patient said, and that may be the source of the input term or phrase that needs to be normalized.

In one embodiment, a natural language processing (NLP) system or module may receive the input term or phrase, and may send a request to a processor of the NLP system, or, for example, the NLP system may be a front end input interface to a remote or connected system that processes medical records and information. The remote system may be connected over the cloud to the NLP system that operates as a "front end" or interface to the remote system. In one example, the remote system may be an artificial intelligence (AI) based medical data processing system.

Figure 1:
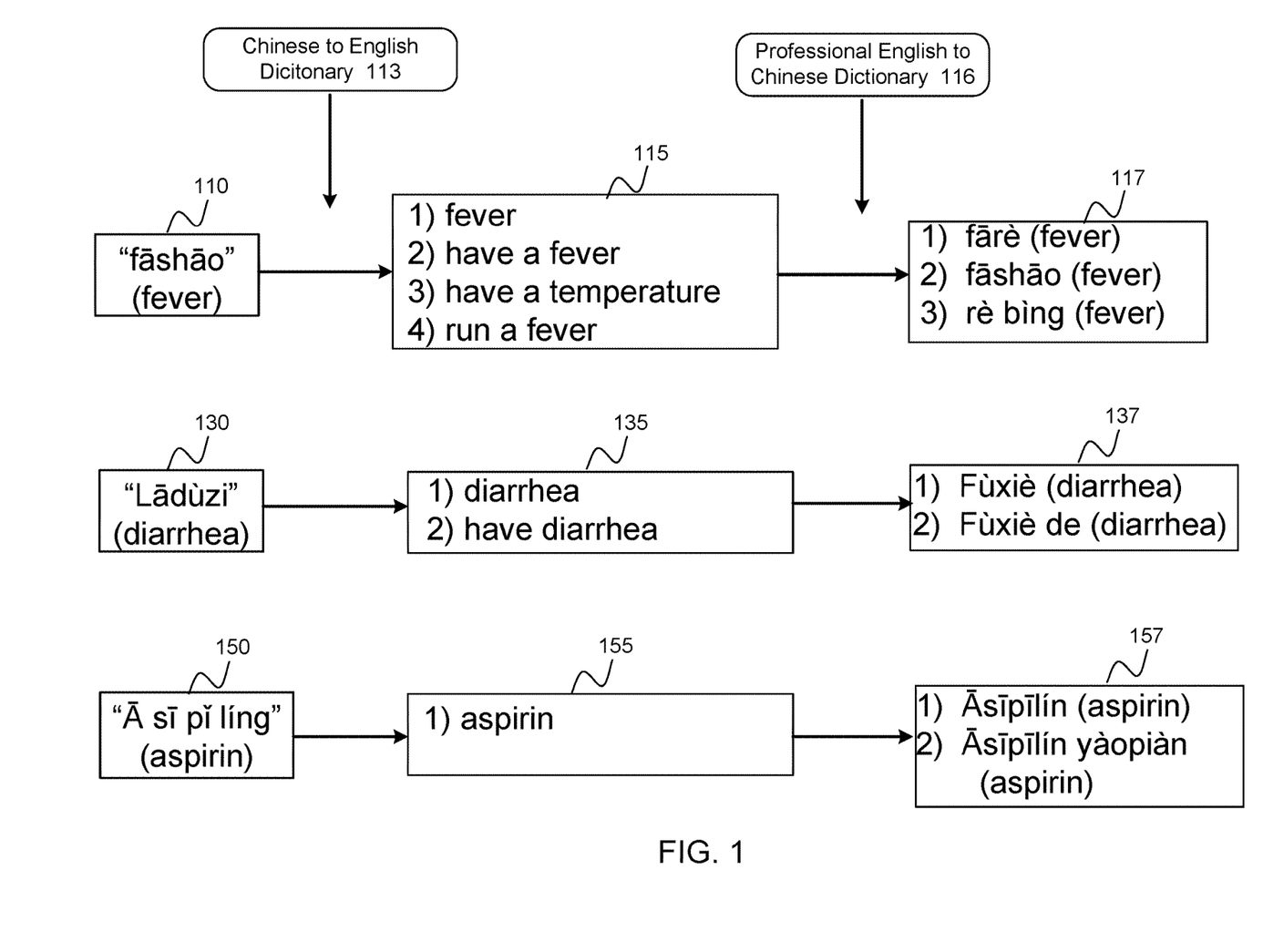
FIG. 1 illustrates translation of three example common medical terms from Chinese into English, and translation of the English translations back into Chinese using professional dictionaries.
Figure 3:
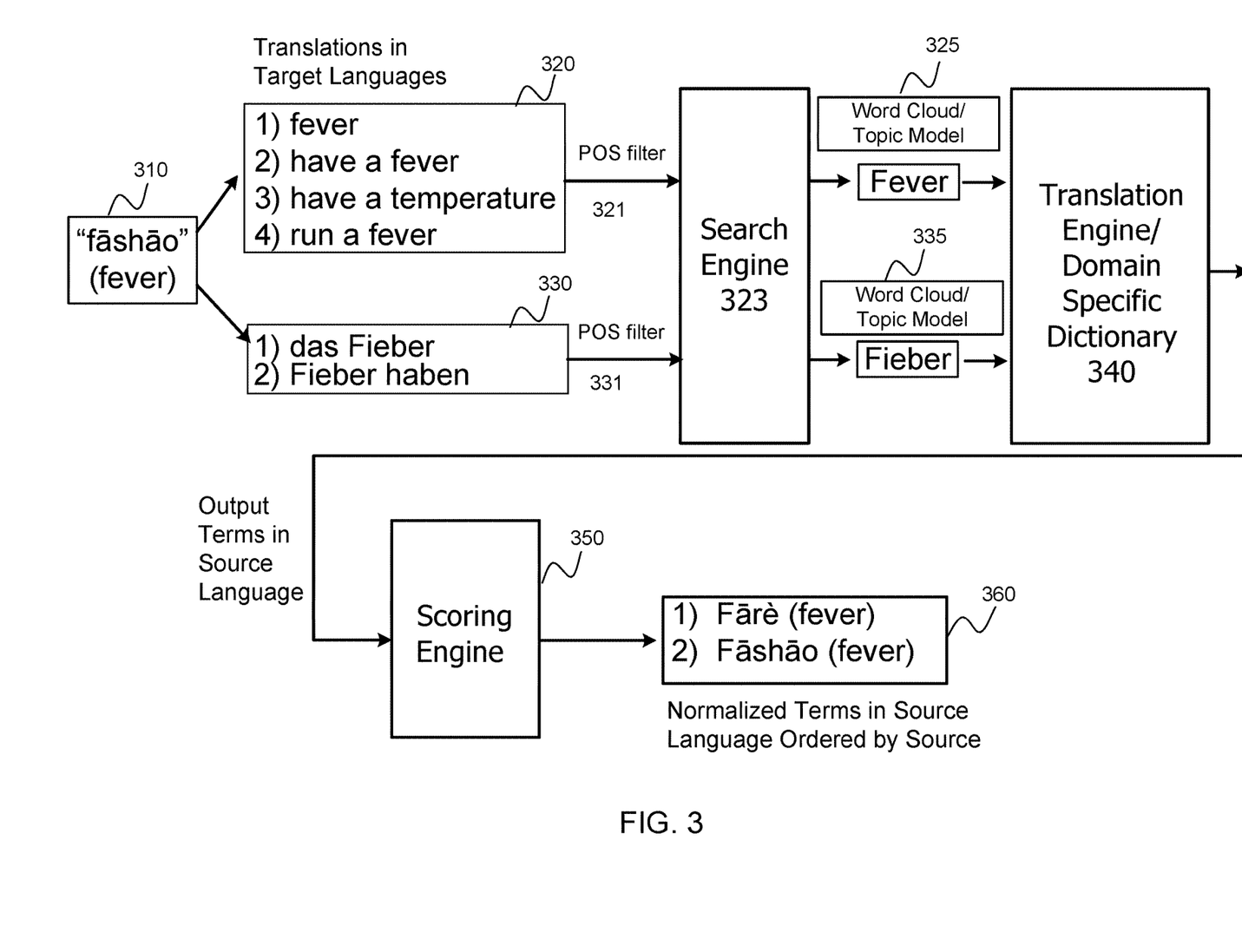
FIG. 3 illustrates details of the medical term normalization engine of FIG. 2, as applied to the example common Chinese term for "fever", 发烧 ("Fāshāo"), according to one embodiment disclosed herein.

Various examples described in this disclosure relate to common Chinese terms used to describe medical conditions. For ease of reading the following disclosure, and for easy reference, the following is an index of Chinese terms used in this disclosure, as shown in FIGS. 1 and 3, respectively, and as used in the descriptions of these figures. For the three example medical terms "FEVER", "DIARRHEA" and "ASPIRIN", the common Chinese term is first presented, followed by a number of possible standard terms obtained according to one embodiment disclosed herein. Following these three medical/drug term sets, are two Chinese words relating to translation and dictionaries. All of these Chinese terms are used in FIGS. 1 and 3.

Fever
  Common Term: 发烧    Fāshāo
  Standard Terms:
  1) 发热    fārè
  2) 发烧    fāshāo
  3) 热病    rè bìng
Diarrhea
  Common Term: 拉肚子    Lādùzi
  Standard Terms:
  1) 腹泻    Fùxiè
  2) 腹泻的    fùxiè de
Aspirin
  Common Term: 阿司匹灵    Ā sī pǐ líng
  Standard Terms:
  1) 阿司匹林    Āsīpīlín
  2) 阿司匹林药片    āsīpīlín yàopiàn
Other Terms (Relating to Translation):
  词典 Cídiǎn Dictionary
  专业词典 Zhuānyè cídiǎn Professional Dictionary
  翻译 Fānyì Translation In embodiments, a common medical term may be translated from its source language into other target languages, and then the translation results in the target languages translated back into the source language to form an output list. For example, the source language may be Chinese, and the target languages English and German. The output list may be scored by a scoring engine, and, when output, ordered by a confidence score. In embodiments, the term with the largest confidence score may be taken as having the highest possibility of being the normalized term to best be used in place of the original common medical term. Some embodiments disclosed herein may be used as a normalization service component of a larger artificial intelligence natural language programming application.

It is noted that the function or process of term normalization is very important in various aspects of information processing, such as, for example, searching, knowledge based question and answer, record generation, medical data mining, and similar applications and systems.

As an example of normalization, in Chinese "发热" (fārè) is the normalized term for fever, but "发烧" (fāshāo) is a common synonym that is frequently used, especially in spoken language. In a knowledge graph, the term "发热", being the standard term, may most often be used for building and indicating relationships with diseases and/or other conditions, such as, for example, "infection." However, if a patient uses the term "发烧", in a description of his or her symptoms, and, without further processing, the term is used in a search for related or underlying conditions, for example, in a computer assisted diagnostic (CAD) application, because the knowledge graphs underlying the CAD application are built using the standard or normalized term "发热" (Fārè), there will be no relationships in the knowledge graphs of the CAD application that contain the common term "发烧" (fāshāo). Thus, to utilize a vast database of accumulated knowledge, diagnostic possibilities, relationships and other data regarding possible connections to a fever, in any input to such a medical information processing system the common name "发烧" (fāshāo) needs to be replaced with the normalized or standard name for this condition, namely "发热" (fārè).

FIG. 1 illustrates translation of three example common medical terms from Chinese into English, and translation of the English translations back into Chinese using professional dictionaries. These are next described with reference to FIG. 1. Beginning at 110 with the common Chinese term 发烧 (fāshāo), the common term is translated (翻译 fānyì) using a Chinese-English dictionary (词典 cídiǎn), as shown at 113. As a result, at 115, there are shown four English translations of the common Chinese term. These include, as shown, "fever", "have a fever", "have a temperature" and "run a fever." As shown at 116, by translating these terms from English back into Chinese, using a professional dictionary (专业词典 Zhuānyè cídiǎn), such as, for example, a domain specific dictionary, three output terms are obtained at 117, namely:

1) 发热    fārè;
2) 发烧    fāshāo; and
3) 热病    rè bìng.

These output terms are the candidates for the most standard, or normalized, term for "fever" in Chinese. As also shown at 117, the three terms are also ranked by highest probability of being the normalized term, or the best normalized term, as assigned by a scoring engine (not shown in FIG. 1), in accordance with various embodiments. The term with the highest score is 发热 fārè, the standard term for fever in Chinese.

Continuing with reference to FIG. 1, a similar process is illustrated for the Chinese common term for "diarrhea", which is 拉肚子 (Lādùzi). At 130 the input term 拉肚子 is entered. At 135, using a dictionary to translate into English, there are shown two English translations of the common Chinese term. These include, as shown, "diarrhea" and "have diarrhea." As shown at 137, by translating these terms back into Chinese, using a professional dictionary (专业词典 Zhuānyè cídiǎn), such as, for example, a domain specific dictionary, two output terms are obtained at 137, namely:

1) 腹泻    Fùxiè; and
2) 腹泻的    fùxiè de.

Continuing still further with reference to FIG. 1, a similar process is illustrated for the Chinese common term for "aspirin", which is 阿司匹灵 (Ā sī pǐ líng). At 150 this input term 拉肚子 is entered. At 155, using the dictionary at 113 to translate into English, there is shown one English translation of the common Chinese term, namely "aspirin." As shown at 157, by translating these terms back into Chinese, using the professional dictionary (专业词典 Zhuānyè cídiǎn) of 116, such as, for example, a domain specific dictionary, two output terms are obtained at 157, namely:

1) 阿司匹林  Āsīpīlín; and

2) 阿司匹林药片  āsīpīlín yàopiàn.

These output terms are the candidates for the most standard, or normalized, term for "aspirin" in Chinese. As also shown at 157, the two terms are ranked by highest probability of being the normalized term, or being the best normalized term, as assigned by a scoring engine (as noted above, not shown in FIG. 1), in accordance with various embodiments.

Figure 2:
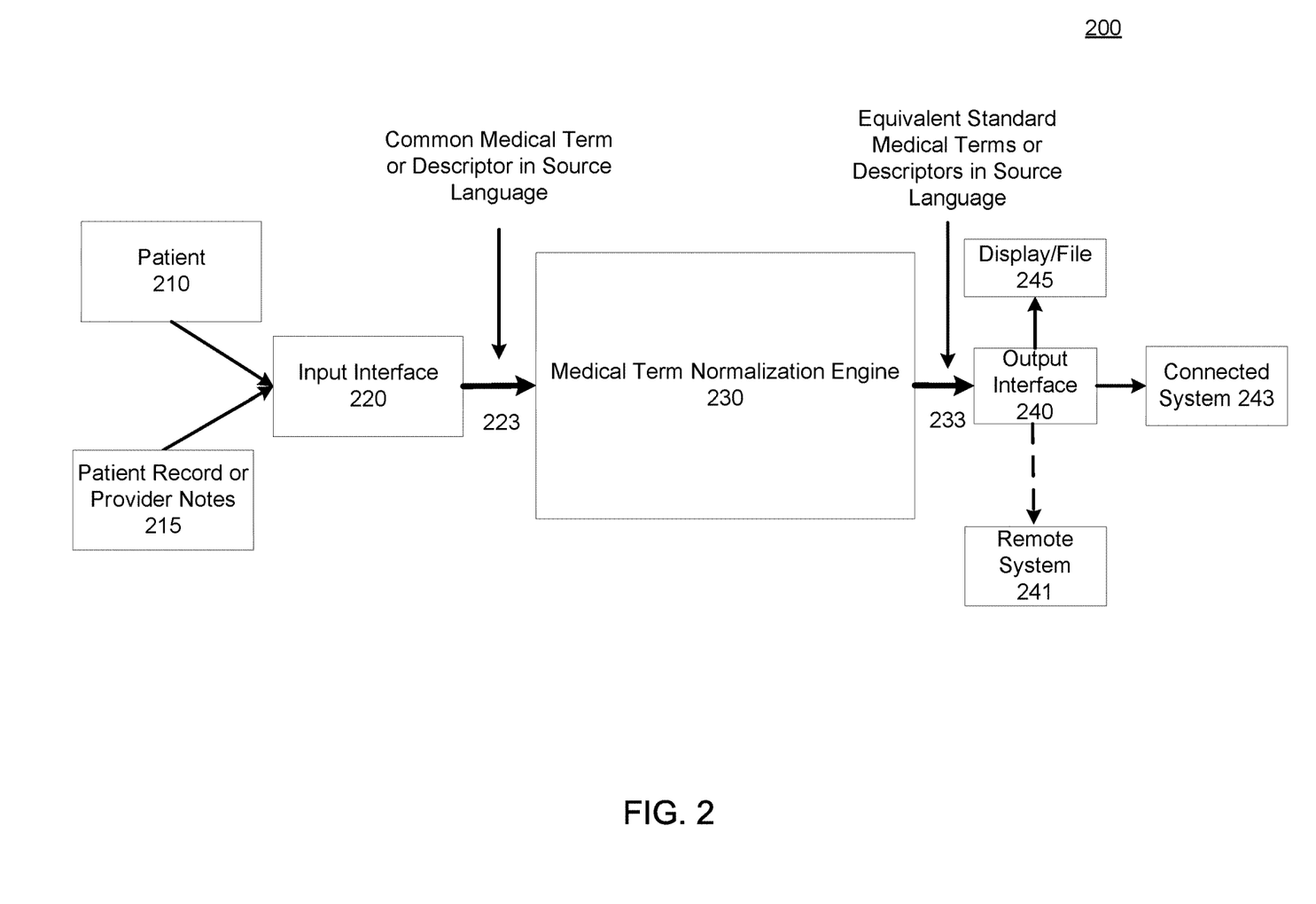
FIG. 2 is an example system diagram, according to one embodiment disclosed herein.

The examples of FIG. 1 illustrate an example process according to one embodiment disclosed herein. FIG. 2, next described, presents an example system 200 for implementing a process such as is shown in FIG. 1.

With reference to system 200 of FIG. 2, there is shown an input interface 220, which is configured to receive both an oral patient dialogue 210, such as, for example, a live conversation with a patient, or, for example, an audio recording of the patient, or, for example, a written record 215, such as, for example, a set of notes taken by a health care provider who first interviewed the patient, such as, for example, a nurse in an emergency room, an assistant in a medical clinic, or the like. In some examples the patient may fill out a form in which he or she lists his or her conditions or complaints to produce patient record 215. In either case, whether via an audio recording or a written record, the patient report includes, in the patient's own words, one or more of a description of symptoms, complaints, references to medications the patient may be taking, or questions of a medical nature.

Continuing with reference to FIG. 2, input interface 220 receives the patient record and extracts terms to be submitted to medical term normalization engine 230, across link 223. As shown, the patient report includes common or colloquial terms as opposed to standard, professional or scientific descriptions of his or her condition(s), and the report is in the patient's spoken language, e.g., Chinese. Thus, input interface 220 outputs a set of common terms in the patient's spoken language to medical term normalization engine 230. In some embodiments, input interface 220 is integrated into medical term normalization engine 230.

Continuing with reference to FIG. 2, medical term normalization engine 230 processes the input terms that it receives from input interface 220, and, using a double translation process described below, outputs, for each input term, to output interface 240 a list of standard or normalized versions of the input term, such as, for example, are shown for the three input terms "发烧 (fāshāo)", "拉肚子 (Lāduzi)" and "阿司匹灵 (Ā sī pǐ líng)" in FIG. 1. In some embodiments, each output list has a score for each term, and the highest scoring term may be utilized as the normalized version of the input term. However, it is noted, entities, be they human or other processing systems, upon receiving the scored output list, may apply different criteria and may choose to use a lower scoring term on the output list in whatever processing they perform on the medical report of the patient. In other embodiments, medical term normalization engine may simply output the normalized term with the best score, where the recipient of the normalized output does not want to decide on its own.

Continuing still further with reference to FIG. 2, output interface 240 may provide the output term, or scored list of output terms, as the case may be, to a user. The user may be a human reading the term at a human-machine interface, for example on a display or in a file 245 created by output interface 240, or, for example, the user may be another processing system. For example, the user may be either a remote system 241, connected over the could to medical term normalization engine 230, or a connected system 243, which, for example, processes medical data included in patient reports, following conversion of identified common terms of the report to normalized terminology.

FIG. 3, next described, illustrates details 300 of the medical term normalization engine of FIG. 2, using, as an illustrative example, the processing of the common Chinese term for "fever", 发烧 ("Fāshāo") as the input medical term, according to one embodiment disclosed herein.

With reference to FIG. 3, an input term 310 is provided to the medical term normalization engine, such as, for example, at the input interface 220 of FIG. 2. In the example of FIG. 3, the input term is 发烧 ("Fāshāo"), as shown. Input term 310 is fed to two translators that operate in parallel, being an English translator 320, and a German translator 330. In embodiments, it is not necessary to have multiple translators, rather optional. However, the likelihood of finding all possible normalized terms in the source language increases with the use of additional translators. In the example of FIG. 3 the two translators are for English and German. In embodiments, any two separate languages may be used. However, it is useful to choose languages that each have a significant and well developed medical vocabulary, and for which there also exist professional dictionaries between the target languages of the translators and the source language of the input term.

Continuing with reference to FIG. 3, the outputs of translators 320 and 330 are fed into search engine 323, after being processed, respectively, by part of speech (POS) filters 321 and 331. In embodiments, POS filters determine what part of speech the translation results are, for example, in this case a fever is a noun. Thus, any verbal form may be deleted or ignored. After POS filtering, search engine 323 may find one, or possibly more than one, best candidates in the target language for re-translation back into the source language. In the example of FIG. 3, the noun "fever" appears in all three translations obtained by English translator 320, and the noun "fieber" appears in all three translations obtained by German translator 330. Thus, these terms are respectively input to domain specific translation engine 340, for re-translation into the source language, here Chinese. Moreover, as may be seen, the third English translation result output by English translator 320, "have a temperature", was not passed to translation engine 340, as shown at 325. This is because search engine 323 determined that this possible phrase is not sufficiently commonly used in English so as to justify the English concept of "temperature" to be specific enough to represent the Chinese input term 发烧 ("Fāshāo").

Details of the interplay between search engine 323 and word cloud/topic model 325, 335 are next described. As shown in FIG. 3, from a term in the source language (here, for example, Chinese), there are several terms in the target language (for example, English) generated at block 320. For each term in the target language, in embodiments, search engine 323 may be used to perform a search on that term. Search engine 323 may be, for example, Google, or Bing, or equivalent. In embodiments, from the results returned by search engine 323 for each queried term 320, a number N of top query results are collected. N may be 30, 40 or 50, or some other number, for example. Collectively, all N top query results, for all of the terms 320 in the target language that were translated from the original input term 310, comprise a result set. From the result set, in embodiments, a topic model 325 is used to obtain a set of topics. The topic model may be, for example, a latent Dirichlet allocation. From the set of topics, a top topic, with its topic words, e.g., those in the topic's word cloud, is selected. The topic words, along with assigned weights that indicate whether the words in the word cloud are more important or of lesser importance, are then stored for further analysis.

For example, for input 310 发烧 ("Fāshāo") in Chinese (as source language), four terms in the target language English are generated at 320, as shown in FIG. 3. Thus, for an example N=30, 120 documents (30 documents for each of the four terms generated at 320) that use the search terms are collected as the result set. From the 120 documents of the result set, topic words are obtained for a top topic using the topic model. For example, the topic words used in the documents of the result set may be "fever", "symptom", "temperature" and "treatment", and the weights assigned to these topic words may be, for example, 0.7, 0.3, 0.3 and 0.2, respectively. In embodiments, the topic words may then be visualized by the word cloud, and the word "fever", the one with the highest weight, will be the most significant word in the word cloud.

In embodiments, the topic words are then re-translated into the source language by translation engine 340. As a result, each word has a different translation (into the source language) with different priorities (or scores). The rank of the re-translated terms may then be calculated by synthesis. In embodiments, the influence factor for the ranking can be the weights in topic words and the priorities in translation. In the example of FIG. 3, the final result output by scoring engine 350 will be "发热" (fārè). In embodiments, for the case where multiple target languages are used, as in the example of FIG. 3, the synthesis strategy for each other target language is similar, and the final results, including re-translations from both target languages, are ranked by the scoring engine 350.

Continuing with reference to FIG. 3, the now Chinese language outputs of domain specific translation engine 340 are all possible normalized terms for the input term in the source language. These possible normalized terms are input to scoring engine 350, which, for example, assigns a probability score to each one. In embodiments the probability score represents a probability that the element of the output list is the normalized or standard term that should be used in place of the patient's original input term, for any further processing, for example, medical informatics, computer aided diagnostics, medical record generation, billing code assignment, etc., regarding the patient's case. In embodiments, the score of each entry of the output list may at least be determined by one or more of the following criteria: relative frequency of the entry in the source language, relative frequency of the translation result in the target language that was translated into the output list entry, relative frequency of the translation result in the target language that was translated into the output list entry in a pre-defined set of medical or pharmaceutical journals, publications, or other professional materials, relative authority or prestige of the dictionary that was used to obtain the output list entry, or relative authority or prestige of the dictionary used to obtain the target language translation result that was re-translated into the element of the output list.

As shown in the example of FIG. 3, at 360 there are shown two words on the output list. The original term 发烧 ("Fāshāo"), as having a lesser probability of being the normalized term, this listed second, and the more clinical term 发热 (fārè), which has the highest probability score, which is listed first. In some embodiments, the entire scored list may be output, or, for example, in alternate embodiments, only the term with the highest probability may be output, such as, for example, where the "user" is a subsequent process, and where it is desired that the normalization engine of FIG. 3 make the decision as to which term should be used as the normalized term. Thus, in such alternate embodiments, only the term 发热 fārè fare would be output.

Figure 4:
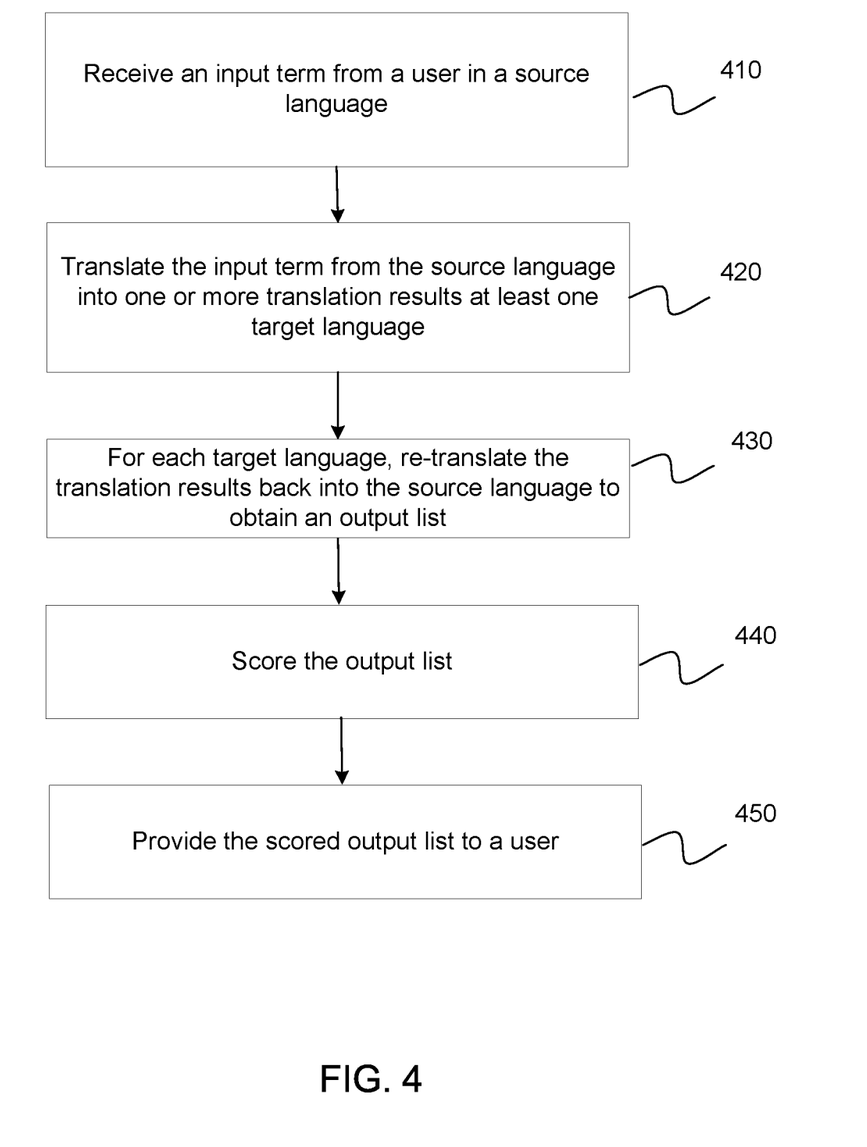
FIG. 4 is a flow diagram illustrating a method to obtain a normalized medical term for an input term or phrase, according to one embodiment disclosed herein.

FIG. 4 is a flow diagram illustrating a method 400 to obtain a normalized medical term for an input medical term or phrase, according to one embodiment disclosed herein. Method 400 includes blocks 410 through 450. In alternate embodiments method 400 may have more, or fewer, blocks. In one embodiment, method 400 may be performed, for example, by system 200 of FIG. 2, or, for example, by system 300 of FIG. 3.

Continuing with reference to FIG. 4, method 400 begins at block 410, where an input term is received from a user in a source language. For example, the user may be a medical professional, and may have obtained either a written patient record or a recording of the patient's description, which includes the patient's descriptions of a medical condition or issue, using his or her own words.

From block 410 method 400 proceeds to block 420, where the input term used by the patient is translated from the source language into one or more translation results of at least one target language. For example, the user may input the Chinese common term for fever, 发烧 fāshāo, which is translated into the English "fever" and the German "fieber", as shown in FIG. 3.

From block 420, method 400 proceeds to block 430, where, for each target language, the translated terms are re-translated into the original source language to obtain an output list. In embodiments, the re-translation uses professional or domain specific dictionaries to perform the re-translation of block 430. Thus, in the example of FIG. 3, professional German-Chinese and English-Chinese medical dictionaries may be used. Alternatively, other dictionaries, of a more general scope, but known to be accurate as to standard scientific and medical terminology, may be used. In the example of FIG. 3, the re-translation results include 发热 fārè , 发烧 fāshāo , and 热病 rèbìng .

From block 430, method 400 proceeds to block 440, where each entry of the output list is scored. For example, the score may be assigned by scoring engine 350 of FIG. 3. In embodiments the score represents a probability that the element of the output list is the normalized or standard term that should be used for the patient's original input term. In embodiments, the score of each entry of the output list may at least be determined by one or more of the following criteria: relative frequency of the entry in the source language, relative frequency of the translation result in the target language that was translated into the output list entry, relative frequency of the translation result in the target language that was translated into the output list entry in a pre-defined set of medical or pharmaceutical journals, publications, or other professional materials, relative authority or prestige of the dictionary that was used to obtain the output list entry, or relative authority or prestige of the dictionary used to obtain the target language translation result that was re-translated into the element of the output list.

From block 440, method 400 proceeds to block 450, where the scored output list is provided to a user. Method 400 ends at block 450. In one or more embodiments, the "user" may be, for example, a human reading the term at a human-machine interface, for example on a display or in a file created by an output interface such as 240 of FIG. 2, or, for example, in what is more common, the user may be another processing system. For example, the user may be either a remote system 241, connected over the could to medical term normalization engine 230, or a connected system 243, which process medical data included in patient reports, following conversion of identified common terms to normalized terminology, as described in connection with FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., medical informatics applications, or other medical data processing applications, including computer assisted diagnostic applications, as described above) or related data available in the cloud. For example, the computer assisted diagnostic application (CAD) could execute on a computing system in the cloud and return to a user device several diseases, conditions or the like. The user could input to a user device a recording of the patient's complaints, and the CAD could return possible diagnoses or related information. As part of the cloud processing the CAD application would convert the patient's non-standard medical terminology to normalized terms, as the knowledge vectors which underlie the CAD application are built using the standard, and not a colloquial, medical vocabulary. The uploaded patient record, such as 215 in FIG. 2, or an uploaded recording of an oral patient interview, such as shown at 210 of FIG. 2, could thus be stored in the cloud, and processed on one or more cloud servers, for example. Doing so allows a user to access the processed patient recording or written record, and the associated list of normalized terms generated from it for each input term, from any computing system attached to a network connected to the cloud (e.g., the Internet). Accordingly, medical informatics processing results of further analytics performed on the patient supplied information could also be accessed, at any time, from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving data including a medically-related input term in a source language;
   translating, using a first dictionary, the input term from the source language into a plurality of target languages to obtain a set of translated terms of the input term;
   for each respective translated term in the set of translated terms, translating, using a second dictionary, from one or more pre-defined domain specific dictionaries, that is specific to a medical domain, the respective translated term back into the source language to obtain an output list of normalized versions of the input term, wherein each normalized version in the output list are specific to the medical domain;
   assigning a respective score to each respective entry of the output list of normalized versions based on a respective probability of the respective entry being the most standard version of the input term;
   identifying an entry of the output list having a highest score; and
   providing the entry of the output list having the highest score as normalized input to a medical data processing application that processes the data.

2. The method of claim 1, wherein the input term is a common version of a medical concept, condition, object, process, or drug.

3. The method of claim 1, wherein each element of the set of translations is translated back into the source language using the one or more pre-defined domain specific dictionaries.

4. The method of claim 3, wherein the one or more pre-defined domain specific dictionaries are professional, scientific, or academic.

5. The method of claim 1, wherein the input term is used in spoken Chinese.

6. The method of claim 1, wherein the plurality of target languages includes two separate target languages.

7. The method of claim 6, wherein the two separate target languages are each European languages.

8. The method of claim 6, wherein, for each of the two separate target languages a body of published medical literature exists.

9. The method of claim 1, further comprising outputting each entry of the output list, and its score, to the medical data processing application.

10. The method of claim 1, wherein the score of each entry of the output list is determined by one or more of:
relative frequency of the entry in the source language, relative frequency of a term in the plurality of target languages that was translated into the entry, or relative authority or prestige of the dictionary that was used to obtain the entry.

11. A computer program product comprising a computer-readable storage medium having computer-readable program code embodied therewith, the computer-readable program code executable by one or more computer processors to perform an operation comprising:
receiving data including a medically-related input term in a source language;
translating, using a first dictionary, the input term from the source language into a plurality of target languages to obtain a set of translated terms of the input term;
for each respective translated term in the set of translated terms, translating, using a second dictionary, from one or more pre-defined domain specific dictionaries, that is specific to a medical domain, the respective translated term back into the source language to obtain an output list of normalized versions of the input term, wherein each normalized version in the output list are specific to the medical domain;
assigning a respective score to each respective entry of the output list of normalized versions based on a respective probability of the respective entry being the most standard version of the input term;
identifying an entry of the output list having a highest score; and
provide the entry of the output list having the highest score as normalized input to a medical data processing application that processes the data.

12. The computer program product of claim 11, wherein the computer-readable program code is further executable to:
output each entry of the output list, and its score, to the medical data processing application.

13. The computer program product of claim 11, wherein each element of the set of translations is translated back into the source language using the one or more pre-defined domain specific dictionaries.

14. The computer program product of claim 13, wherein the one or more pre-defined domain specific dictionaries are professional, scientific, or academic.

15. The computer program product of claim 11, wherein the score of each entry of the output list is determined by one or more of:
relative frequency of the entry in the source language, relative frequency of a term in the plurality of target languages that was translated into the entry, or relative authority or prestige of the dictionary that was used to obtain the entry.

16. A system, comprising:
one or more computer processors; and
a memory containing a program which when executed by the one or more computer processors performs an operation, the operation comprising:
receiving data including a medically-related input term in a source language;
translating, using a first dictionary, the input term from the source language into a plurality of target languages to obtain a set of translated terms of the input term;
for each respective translated term in the set of translated terms, translating, using a second dictionary, from one or more pre-defined domain specific dictionaries, that is specific to a medical domain, the respective translated term back into the source language to obtain an output list of normalized versions of the input term, wherein each normalized version in the output list are specific to the medical domain;
assigning a respective score to each respective entry of the output list of normalized versions based on a respective probability of the respective entry being the most standard version of the input term;
identifying an entry of the output list having a highest score; and
providing the entry of the output list having the highest score as normalized input to a medical data processing application that processes the data.

17. The system of claim 16, the operation further comprising:
outputting each entry of the output list, and its score, to the medical data processing application.

18. The system of claim 16, wherein each element of the set of translations is translated back into the source language using the one or more pre-defined domain specific dictionaries.

19. The system of claim 18, wherein the one or more pre-defined domain specific dictionaries are professional, scientific, or academic.

20. The system of claim 16, wherein the score of each entry of the output list is determined by one or more of:
relative frequency of the entry in the source language, relative frequency of a term in the plurality of target languages that was translated into the entry, or relative authority or prestige of the dictionary that was used to obtain the entry.

* * * * *